United States Patent [19]

Kawa

[11] 4,010,446

[45] Mar. 1, 1977

[54] CHARACTER PATTERN LINE THICKNESS REGULARIZING DEVICE

[75] Inventor: Ryuichi Kawa, Tokyo, Japan

[73] Assignee: Kabushiki Kaisha Ricoh, Tokyo, Japan

[22] Filed: June 27, 1974

[21] Appl. No.: 483,740

[30] Foreign Application Priority Data

July 2, 1973  Japan ............................. 48-74649

[52] U.S. Cl. ............. 340/146.3 H; 340/146.3 MA
[51] Int. Cl.$^2$ ........................................ G06K 9/12
[58] Field of Search ......... 340/146.3 H, 146.3 MA, 340/146.3 R

[56] References Cited

UNITED STATES PATENTS

| | | | |
|---|---|---|---|
| 3,106,699 | 10/1963 | Kamentsky | 340/146.3 H |
| 3,339,179 | 8/1967 | Shelton, Jr. et al. | 340/146.3 H |
| 3,573,789 | 4/1971 | Sharp et al. | 340/146.3 H |
| 3,668,638 | 6/1972 | Iijima et al. | 340/146.3 H |
| 3,753,229 | 8/1973 | Beun et al. | 340/146.3 H |
| 3,846,754 | 11/1974 | Oka et al. | 340/146.3 H |

*Primary Examiner*—Leo H. Boudreau
*Attorney, Agent, or Firm*—Frank J. Jordan

[57] ABSTRACT

Line portions of the character pattern in a character recognition device which have a thickness less than a selected standard value are thickened by a thickening circuit to the selected value. The line thickness of the character is then uniformly thinned by a thinning circuit and the thickening process is repeated. A correction circuit may be provided to prevent the continuity of the character from being broken in the thinning circuit.

16 Claims, 18 Drawing Figures

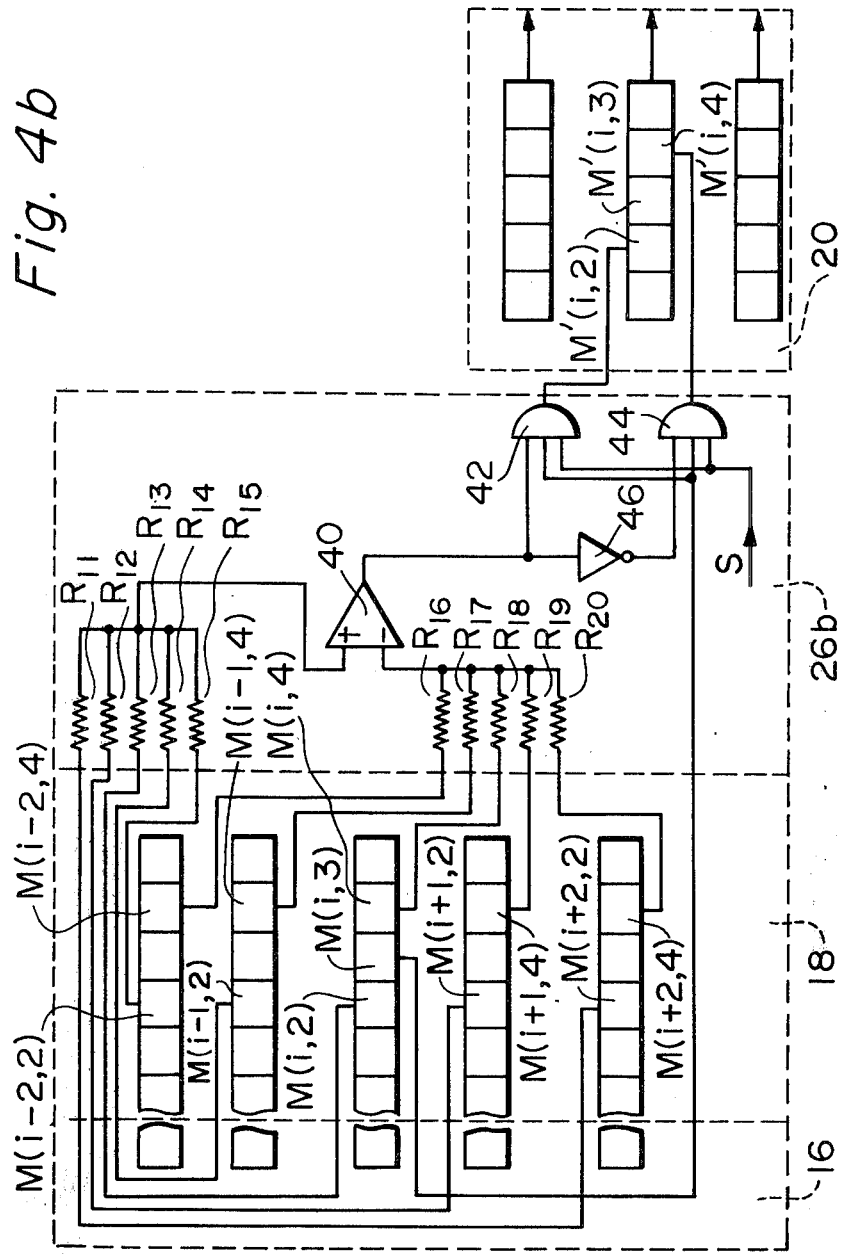

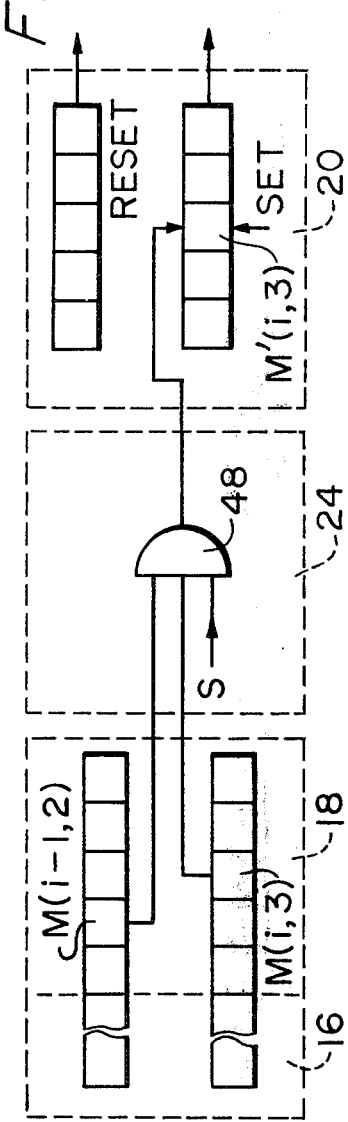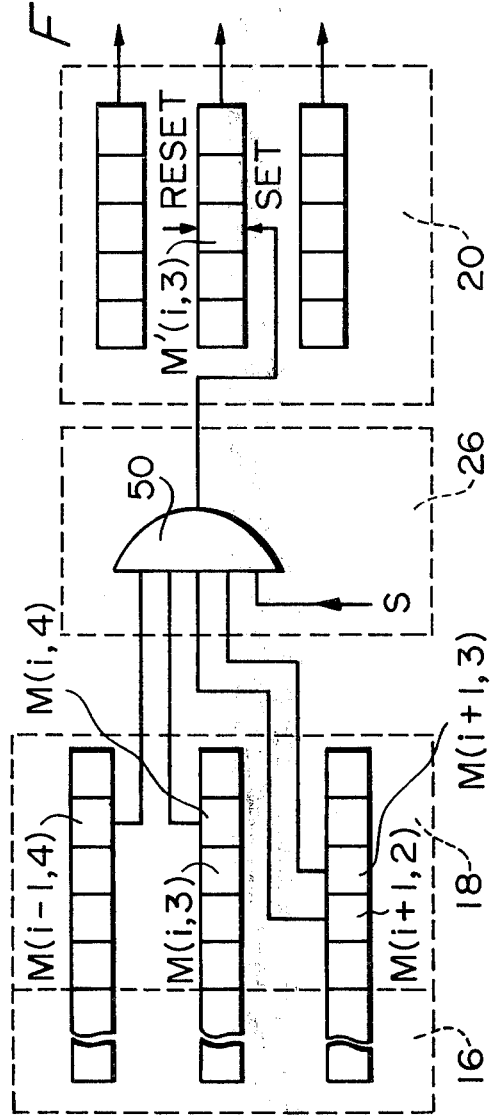

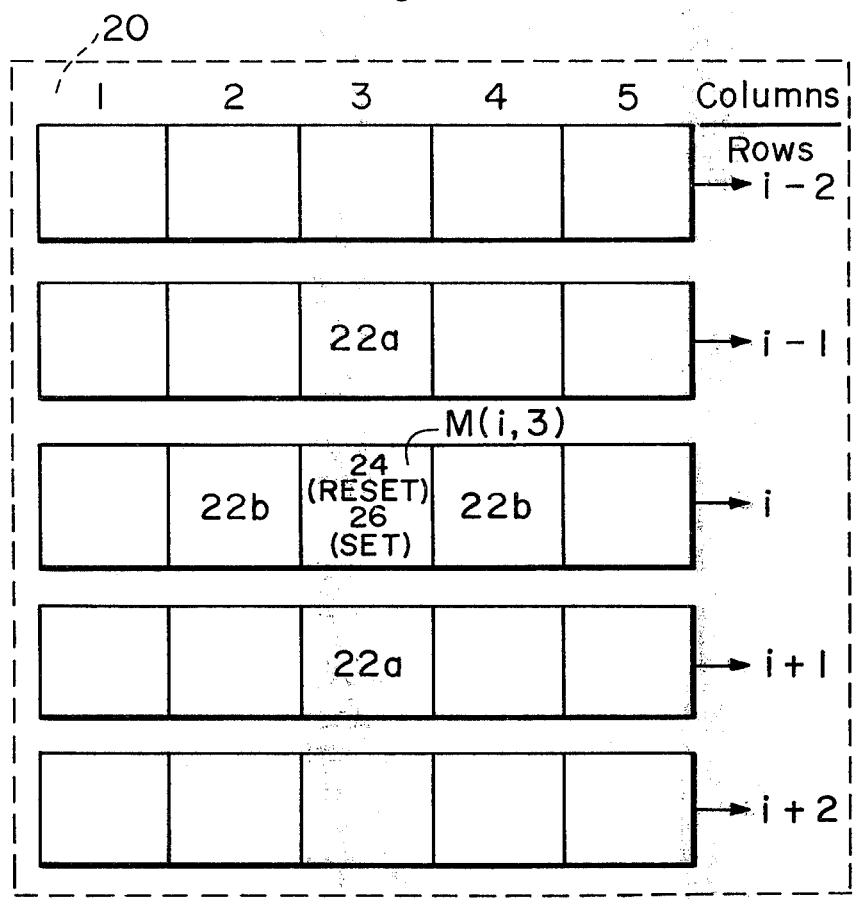

CHARACTER PATTERN LINE THICKNESS REGULARIZING DEVICE

The present invention relates generally to a character recognition system, and more particularly to a line thickness normalizing or regularizing device for such a system arranged to operate on the character pattern produced by a scanner to adjust the line thickness of the scanned character to a standard value prior to comparison of the character with internally stored characters.

In a character recognition device to which the present invention relates, a document on which a character is printed or handwritten is scanned by a unit such as a flying spot scanner. Electrical signals are produced by the scanner representing areas of the document corresponding to the character and its background and stored in a memory unit in the form of a character pattern which is analogous to the original document. The electrical signals represent the document in quantized form, and, for example, a positive signal or 1 state may represent a point on the character and no signal or a 0 state may represent a point on the background of the document. The character pattern in the memory is then compared on a bit by bit basis with the patterns of known characters stored in the recognition system, and the character represented in the memory unit is defined to be or recognized as the known character which it most closely resembles.

The effectiveness of such a character recognition system deteriorates, however, if the line thickness of the character in the memory unit is significantly different from the line thickness of the known characters, such is often the case when the character on the document is written by hand. In the worst case, the character on the document may be erroneously recognized as a different character. As an example of such erroneous operation, the centroid of the scanned character is often computed and used as a reference point in the evaluation process. If, however, the line thickness of the upper portion of the input character is less than that of the lower portion, the centroid of the character will be calculated at a point lower than the true centroid of the character. This will make correct recognition of the character extremely difficult.

A prior art attempt to solve this problem involves calculating the mean value of the line thickness of the input character and adjusting the line thickness of the entire character to this mean value. This method is unacceptable in that it is extremely difficult to calculate the mean line thickness, and an apparatus to do so is prohibitively expensive.

In another prior art system, the pattern in the memory unit is divided into square blocks of 3 × 3 bits each and logical coincidence is determined in each of the blocks. When coincidence occurs, respective portions of the character pattern are deleted to provided a character pattern with a uniform line thickness of one bit. However this system suffers drawbacks in that the input pattern must have a specific line thickness (such as 2 bits) and a tremendous number of logic elements are required. Also, the logical coincidence is effected by the framing (or offset) of the center of the character from the center of the portion of the document scanned, and erroneous operation frequently results.

It is therefore an object of the present invention to provide a character pattern line thickness regularizing device especially suited to a character recognition system to modify the input character pattern to have a regular or standard line width.

It is another object of the present invention to provide a method of regularizing the line thickness of a character pattern so as to improve the performance of a character recognition system.

The above and other objects, features and advantages of the present invention will become clear from the following detailed description taken with the accompanying drawings in which:

FIGS. 4a and 4b are schematic circuit diagrams of a thickening circuit constituting part of the device shown in FIG. 3;

FIG. 5 is a schematic circuit diagram of a uniformly thinning circuit constituting part of the device shown in FIG. 3;

FIG. 6 is a schematic circuit diagram of a correction circuit to be used in conjunction with the uniformly thinning circuit shown in FIG. 5;

FIGS. 8a – 8d are graphic representations of the connection of various circuits of the device shown in FIG. 3.

Figure 1A:
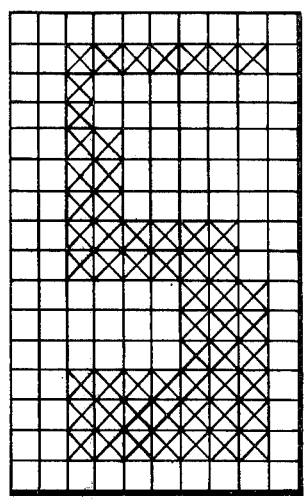
FIGS. 1a to 1d are graphic representations of a method according to the present invention.

Referring not to the drawings, the character pattern shown in FIG. 1a is produced by scanning a document on which the character 5 is written. As can be clearly seen, due to the style of handwriting of the person who wrote the character 5 on the document, the upper horizontal line and the top 2 bits of the upper vertical line have a line thickness of 1 bit, while lower horizontal and vertical lines have a line thickness of 3 bits. This would result in calculation of the centroid of the character at a point lower than its true centroid, and other difficulties in recognition of the character such as reduction of similarity between the input character and the known characters stored in the character recognition system for comparison purposes. According to the method of the present invention, a standard line thickness is decided upon (in this exemplary case 2 bits), and the line thickness of the entire character is adjusted to the standard line thickness. As the first step, the character pattern is operated upon on a bit by bit basis to thicken line portions of the character which have a thickness less than the standard thickness to the standard thickness. The results of this step are shown in FIG. 1b, in which the upper horizontal line of the character 5 and the upper portion of the upper vertical line are thickened to 2 bits. It will be noticed that portions of the character having a line thickness of 2 bits or more are not altered, and that there remain portions of the character having a line thickness of 3 bits.

Figure 1C:
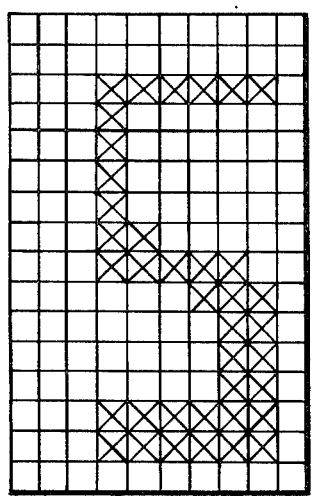
Figure 1B:
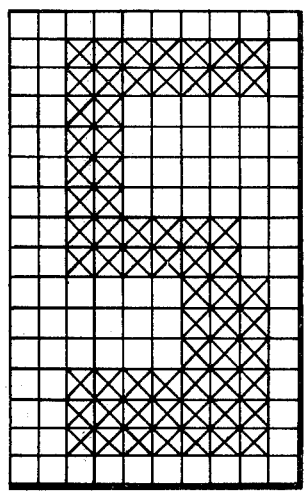
Figure 1D:
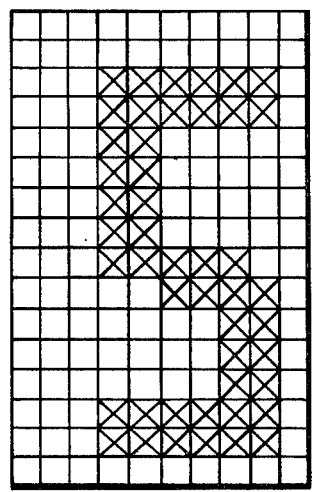

As the next step, the line thickness of the entire character is reduced or thinned by one bit, as shown in FIG. 1c. It will be noticed that most of the upper portion of the character now has a line thickness of one bit while the lower portion has a line thickness of 2 bits. In the final step, as shown in FIG. 1d, the thickening operation is repeated so that the line thickness of the upper part of the character is increased to 2 bits and the entire character has a uniform line thickness of 2 bits. If desired, this sequence of steps may be repeated a number of times.

Figure 2:
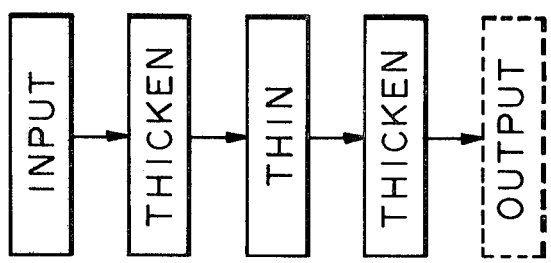
FIG. 2 is a flow chart illustrating the major steps in the method of FIGS. 1a to 1d.

This method is also illustrated in FIG. 2 as a flowchart, in which the input step is the scanning of the document and storage of the quantized character pattern in the memory unit of the character recognition system, and the output step is the comparison of the line thickness regularized character pattern with the known character patterns stored in the system.

Figure 3:
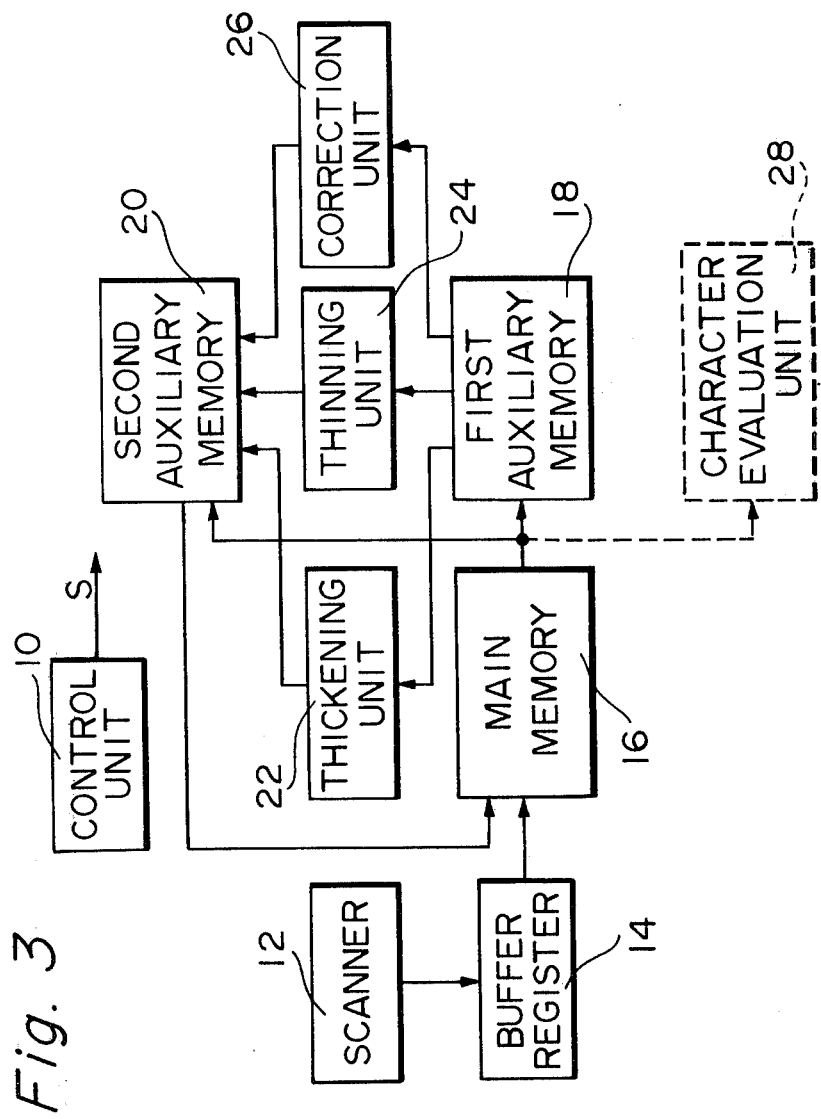
FIG. 3 is a block diagram of a line thickness regularizing device embodying the present invention employed in a character recognition system.

FIG. 3 illustrates a line thickness regularizing device embodying the present invention employed in a character recognition system. A control unit 10 is arranged to control the operation of the entire system by utilizing a programmed sequence of operational commands and feeding control signals to the various units. The technology for such a control unit 10 is well known in the art and will not be described herein in detail. Although the connections are not shown, the control unit 10 is connected to all other units of the device to control their operation.

A flying spot scanner 12 is arranged to scan a document (not shown) on which a character to be recognized is printed or written by hand. The scanner 12 divides the document into rectangular areas and generates a train of electrical pulse signals corresponding to the character and its background. For purposes of explanation, it will be assumed that the scanner 12 scans the document in a horizontal raster pattern from left to right, up to down, and generates a positive pulse or logical 1 signal for each area on the character, and no signal or a logical 0 signal for each area on the background of the document. A buffer register 14 is arranged to accumulate the signals representing the character pattern one line at a time, and transfer the pattern one line at a time to storage means comprising a main memory 16. It will be assumed that the document is divided into a pattern of $m$ lines and $n$ columns. The buffer register 14 thereby has a capacity of $n$ bits and the main memory 16 is composed of m shift registers each having a capacity of $n$ bits. As a line is scanned by the scanner 12, the signals representing the line are stored in the buffer register 14, and when the scan of the line is completed, the contents of the buffer register 14 are transferred in parallel to the shift register in the main memory 16 corresponding to the line scanned. In this manner, a character pattern of electrical signals constituting a quantized representation of the document is stored in the main memory 16.

The exemplary device also comprises a first auxiliary memory 18 and a second auxiliary memory 20, both of which are constituted by the same number of shift registers as the main memory 16. However, the shift registers of the auxiliary memories 18 and 20 have a capacity of only 5 bits each. If desired, the main memory 16 and the auxiliary memory 18 may be integral.

The output ends of the shift registers of the main memory 16 are connected respectively to the input ends of the shift registers of both the auxiliary memories 18 and 20. The output ends of the shift registers of the auxiliary memory 20 are connected to the input ends of the shift registers of the main memory 16 to form $m$ closed loops. The output ends of the shift registers of the main memory 16 are also connected to a character evaluation unit 28 containing known character patterns with which to compare the character pattern in the main memory 16. The unit 28 is an output unit for the line thickness regularizing device and does not constitute a part of the present invention.

Inputs of a plurality of thickening circuits or units 22, thinning circuits or units 24 and correction circuits or units 26 are connected to the shift registers of the auxiliary memory 18. M each of the units 22, 24 and 26 are provided, although only one each is shown for simplicity of illustration. The outputs of the units 22, 24 and 26 are connected to the shift registers of the auxiliary memory 20.

Referring briefly to FIGS. 7a to 7d, the function of the correction units 26 is illustrated. Given the character pattern of FIG. 7a, as will be described in detail below, operation of the thinning units 24 would produce the configuration of FIG. 7b, in which the line continuity of the character is broken. The correction units 26 serve to supplement the character pattern of FIG. 7a with portions 30 shown in FIG. 7c prior to operation of the thinning units 24, so that operation on the character pattern of FIG. 7c by the thinning units 24 produces the desired character pattern of FIG. 7d, in which the line continuity of the character is maintained.

As referred to in the following description, the document is defined as the original paper or the like on which the character is written. The character pattern is the quantized representation of the document provided in the main and auxiliary memories 16, 18 and 20 in the form of electrical signals, or analogously in the logical states of the flip-flops (not shown) making up the shift registers of the memories. The main and auxiliary memories 16, 18 and 20 define therewithin a matrix, through which the character pattern may be shifted in the horizontal direction. A point on the character portion of the document is represented as a logical 1 electrical signal or state in the matrix, and a point on the background portion of the document is represented as a logical 0 electrical signal or state. The contents of a given flip-flop of a shift register of the memories 16, 18 and 20 may be any bit on the corresponding line of the character pattern, indicating that the bit may occupy and point on the same horizontal line of the matrix by progressively transforming (shifting) the orientation of the character pattern within the matrix.

In operation, the character pattern is produced and stored in the main memory 16 by the scanner 12 and the buffer register 14. Subsequently, the character pattern is shifted $n + 5$ times to the right while the thickening units 22 are activated by a control signal S from the control unit 10. A specific point in the character pattern will move through the main and auxiliary memories 16 and 20 to finally occupy its original position in the main memory 16. As the point in the character pattern occupies a central horizontal position in the auxiliary memory 18, a duplicate of the point will occupy a central horizontal position in the auxiliary memory 20. The inputs of the units 22, 24 and 26 are connected to sense the central horizontal bits of the shift registers of the auxiliary memory 18, and operate on the central horizontal bits of the shift registers of the auxiliary memory 20. Thus, as each point in the character pattern occupies a central horizontal position in the auxiliary memory 18, its duplicate is simultaneously being operated on in the auxiliary memory 20 by the thickening units 22. The thickened version of the character pattern is thereby progressively produced from the original character pattern in the auxiliary memory 20 and re-stored in the main memory 16 based on the sensed duplicate of the original character pattern in the auxiliary memory 18. After $n + 5$ shifts, the thickened character pattern of FIG. 1b is produced from the original character pattern of FIG. 1a and re-stored in the original relative position in the main memory 16.

Figure 7A:
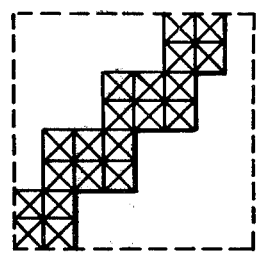
FIGS. 7a to 7d are graphic representations of the function of the correction circuit shown in FIG. 6.
Figure 7B:
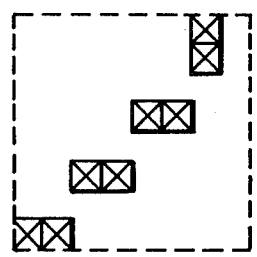
Figure 7C:
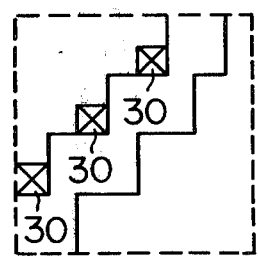
Figure 7D:
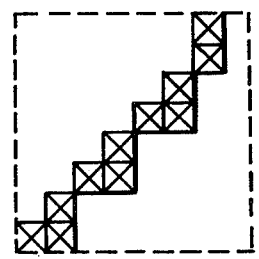

As the next step, the thickening units 22 are deactivated and the correction units 26 are activated by the signal S. The memories 16, 18 and 20 are then shifted $n + 5$ times, and the thickened pattern of FIG. 1b is sensed in the auxiliary memory 18 and a corrected pattern in the manner of that of FIG. 7c is produced in the auxiliary memory 20 and re-stored in the main memory 16. Subsequently, the correction units 26 are deactivated and the thinning units 24 are activated by the signal S. The memories 16, 18 and 20 are shifted $n + 5$ times and the corrected character pattern is sensed in the auxiliary memory 18 and the thinned character pattern of FIG. 1c is produced in the auxiliary memory 20 and re-stored in the main memory 16. As the final step, the memories 16, 18 and 20 are again shifted $n + 5$ times with the thickening units 22 activated and the thinned pattern of FIG. 1c is sensed in the auxiliary memory 18 and the final character pattern of FIG. 1d is produced in the auxiliary memory 20 and re-stored in the main memory 16.

Figure 4A:
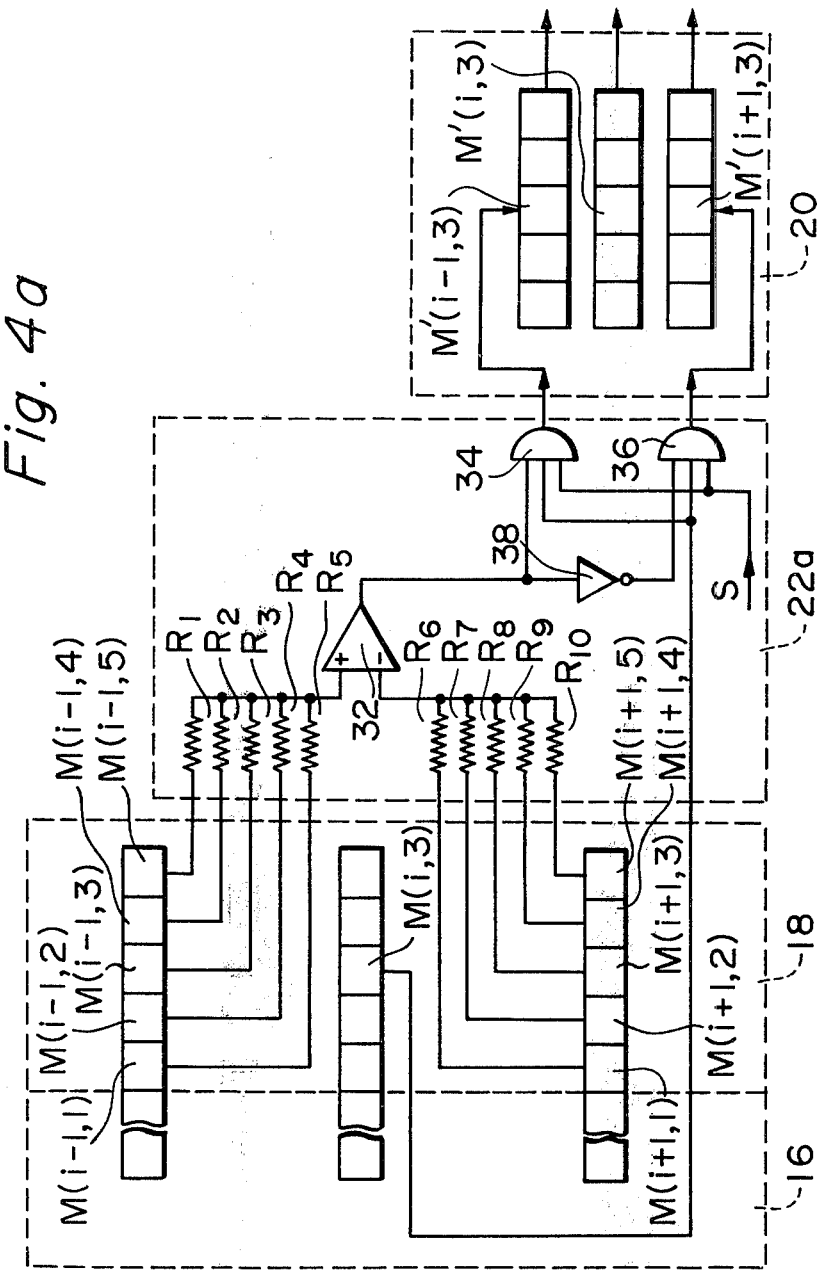

Referring now to FIGS. 4a and 4b, the thickening units 22 are seen to each comprise a vertical thickening unit 22a shown in FIG. 4a and a horizontal thickening unit shown in FIG. 4b. In FIG. 4a, the vertical thickening unit 22a has its inputs connected to the first auxiliary memory 18 and its outputs connected to the second auxiliary memory 20. The vertical thickening unit 22a comprises a resistor weighting network composed of resistors $R_1$ to $R_{10}$. One end of each of the resistors $R_1$ to $R_5$ is connected to a positive input of a comparator 32, and the other ends of the resistors $R_1$ to $R_5$ are individually connected to various points or flipflops in the shift registers of the first auxiliary memory 18. Similarly, one end of each of the resistors $R_6$ to $R_{10}$ is connected to a negative input of the comparator 32, and the other ends are individually connected to various points in the memory 18. The output of the comparator 32 is connected directly to an input of a first AND gate 34 and to an input of a second AND gate 36 through an inverter 38. Other inputs of the AND gates 34 and 36 are adapted to receive the signal S from the control unit 10, which activates the vertical thickening unit 22a by enabling the AND gates 34 and 36. The outputs of AND gates 34 and 36 are connected to the set terminals of various points or flip-flops in the shift registers of the second auxiliary memory 20. Third inputs of the AND gates 34 and 36 are also connected to the memory 18.

Figure 8A:
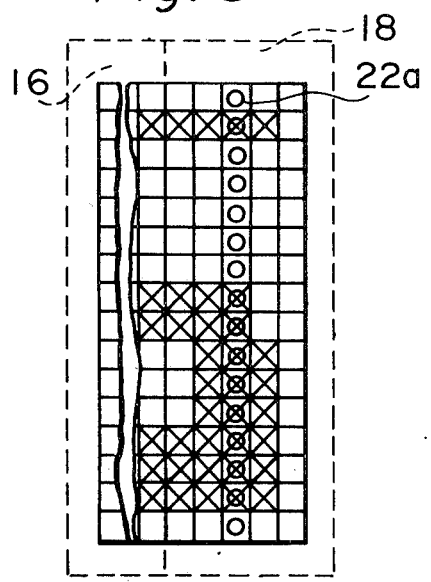
Figure 8B:
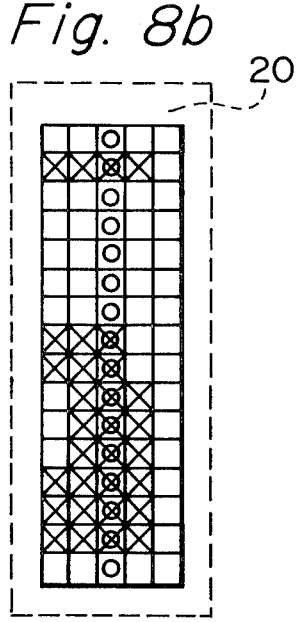

Referring briefly to FIGS. 8a and 8b, the auxiliary memories 18 and 20 are diagrammatically shown for purposes of explanation as each comprising 16 shift registers (no numerals), each having a 5 bit capacity ($m = 16$). A point or flip-flop in the first auxiliary memory 18 is designated as $M(i, j)$, where $i$ designates the line ($i = 1$ to $m$ or 1 to 16) and $j$ designates the column ($j = 1$ to 5). Corresponding points in the second auxiliary memory are designated as $M'(i, j)$. The horizontally central point in each shift register of the memory 18 is thus designated as $M(i, 3)$, and that in the memory 20 as $M'(i, 3)$. As designated in FIG. 8a by 16 circles, 16 vertical thickening units 22a have their inputs connected to respective points in column 3 of the memory 18 in a vertical arrangement. Thus, each vertical thickening unit 22a senses one point at a time of one line of the memory 18. As will be described below, each vertical thickening unit 22a simultaneously senses more than one point in the memory 18, but it will be considered that the respective point $M(i, 3)$ is the sensed or selected point and other points sensed simultaneously with the point $M(i, 3)$ represent resent the neighborhood of the sensed point $M(i, 3)$. As shown in FIG. 8b, the outputs of the vertical thickening units 22a are respectively connected to column 3 of the memory 20 in an arrangement identical to that of FIG. 8a. Thus, as a point in column 3 of the memory 18 is sensed by a vertical thickening unit 22a, the corresponding point in column 3 of the memory 20 is operated upon for thickening.

As will be understood from a later detailed description of FIGS. 8c and 8d, 16 each of the horizontal thickening units 22b, the thinning units 24 and the correction units 26 have their inputs and outputs connected respectively to the same points in the memories 18 and 20 as the vertical thickening units 22a.

Referring back to FIG. 4a, the third inputs of the AND gates 34 and 36 are connected to an exemplary point $M(i, 3)$ of line $i$ of the memory 18. The positive input of the comparator 32 is connected to the points $M(i - 1, 1$ to $5)$ of line $i - 1$ (the line above line $i$) through the resistors $R_5$ to $R_1$ respectively. Similarly, the negative input of the comparator 32 is connected to the points $M(i + 1, 1$ to $5)$ of the line $i + 1$ (the line below line $i$) through the resistors $R_6$ to $R_{10}$ respectively. The outputs of the AND gates 34 and 36 are connected to the set inputs of points $M'(i - 1, 3)$ and $M'(i + 1, 3)$, which are the points directly above and below the point $M'(i, 3)$ respectively in the memory 20. The comparator 32 is adapted to produce a logical '0' output when the following inequality is fulfilled:

$$\sum_{k=1}^{5} \frac{M(i-1, j-3+k)}{R(i-1, j-3+k)} \leq \sum_{k=1}^{5} \frac{M(i+1, j-3+k)}{R(i+1, j-3+k)} \quad (1)$$

where $R_{(i-1, j-3+k)}$ and $R_{(i+1, j-3+k)}$ are the resistors $R_5$ to $R_1$ and $R_6$ to $R_{10}$ connected to the points $M(i-1, j-3+k)$ and $M(i+1, j-3+k)$ respectively.

Thus, when the sum of the weighted values of the sensed points in the line $i - 1$ above line $i$ is less than or equal to the sum of the weighted values of the sensed points in the line $i + 1$ below line $i$, the comparator 32 will produce a logical 0 output which will be inverted by the inverter 38 and gated through the AND gate 36 to the set input of the point $M'(i + 1, 3)$ of the memory 20 if and when the point $M(i, 3)$ is logical 1. If the point $M'(i + 1, 3)$ is not already logical 1, it will be set to logical 1.

Conversely, if inequality (1) is not fulfilled, the comparator 32 will produce a logical 1 output which will be gated through the AND gate 34 to the set input of the point $M'(i - 1, 3)$ of the memory 20 if and when the point $M(i, 3)$ is logical 1. The point $M'(-1, 3)$ will be made logical 1 if it is not already logical 1.

In other words, considering the simple case in which the values of all the resistors $R_1$ to $R_{10}$ are equal (equal weighting), when the line $i - 1$ above line $i$ has more points which are logical 1 (points on the character rather than the background) than the line $i + 1$ below line $i$, the point $M'(i - 1, 3)$ directly above point $M'(i, 3)$ (the sensed point) will be made to represent a point on the character if and when the sensed point $M(i, 3)$ is logical 1. When the line $i - 1$, 3 above line i has the same number of or less points on the character than line $i +$ below line i, the point M′($i + 1$, 3) directly below the sensed point M′($i$, 3) will be made to represent a point on the character if and when the sensed point is logical 1. In this manner, horizontal lines having a line thickness of one bit are vertically thickened to 2 bits. Proper selection of the values of the weighting resistors $R_1$ to $R_{10}$ will prevent portions of the character having a line thickness of 2 bits or more from being thickened by the vertical thickening unit 22a.

Referring not to FIG. 4b, the construction and operation of the horizontal thickening unit 22b shown is essentially similar to that of the vertical thickening unit 22a. In FIG. 4b, however, the point M($i$, 3) and points in the columns to the left and right of the sensed point M($i$, 3) are sensed, and when the sensed point M($i$, 3) represents a point on the character (logical 1), one of the points M′($i$, 2) and M′($i$, 4) directly to the left and right respectively of the point M′($i$, 3) is made logical 1 if it is not already logical 1. In FIG. 4b, the positive input of comparator 40 is connected through resistors $R_{15}$ to $R_{11}$ to the points M ($i - 2$ to $i + 2$, 2) respectively of the memory 18. The negative input of the comparator 40 is connected through resistors $R_{16}$ to $R_{20}$ to the points M($i - 2$ to $i + 2$, 4) respectively of the memory 18. The output of the comparator 40 is connected directly to an input of an AND gate 42 and to an input of an AND gate 44 through an inverter 46. Third and second inputs of the AND gates 42 and 44 are connected to the point M($i$, 3) of the memory 18 and to the control unit 10 to receive the control signal S. The outputs of the AND gates 42 and 44 are respectively connected to the set inputs of the points M′($i$, 2) and M′($i$, 4) directly to the left and right of the sensed point M′($i$, 3) in the memory 20. The comparator 40 is arranged to produce a logical 0 signal and a logical 1 signal when the following inequality is fulfilled and unfulfilled respectively:

$$\sum_{k=1}^{5} \frac{M(i-3+k, j-1)}{R(i-3+k, j-1)} \leq \sum_{k=1}^{5} \frac{M(i-3+k, j+1)}{R(i-3+k, j+1)} \quad (2)$$

where $R_{(i-3+k, j-1)}$ and $R_{(i-3+k, j+1)}$ are resistors $R_{15}$ to $R_{11}$ and $R_{16}$ to $R_{20}$ connected to the points M($i - 3 + k, j - 1$) and M($i - 3 + k, j + 1$) respectively.

Thus, the point in the column directly to the left or right of the sensed point M($i$, 3) having more points on the character will be made logical 1 if and when the sensed point M($i$, 3) is logical 1.

Referring now to FIG. 5, which shows one of the thinning units 24, only the lines $i - 1$ and $i$ of the memories 18 and 20 are shown for simplicity of illustration. The thinning unit 24 comprises an AND gate 48 which has inputs connected to the points M($i - 1$, 2) and M($i$, 3) of the memory 18 and the control unit 10 to receive the signal S, and an output connected to the reset terminal of the point M′($i$, 3) of the memory 20. The sensed point M($i$, 3) is compared with its northwest neighbor M($i - 1$, 2) in the memory 18, and if both represent points on the character (are logical 1), the point M′($i$, 3) in the memory 20 is reset to logical 0 to represent a point on the background. In this manner, the character pattern is uniformly thinned.

FIG. 6 shows one of the correction units 26, which comprises an AND gate 50 having inputs connected to the points M($i - 1$, 4), M($i$, 4), M($i + 1$, 2) and M($i + 1$, 3) of the memory 18 and to the control unit 10 to receive the signal S. The output of the AND gate 50 is connected to the set terminal of the point M′($i$, 3) of the memory 20. Thus, if all of the inputs to the AND gate 50 are logical 1, a portion 30 (see FIG. 7c) is created by gating a logical 1 signal through the AND gate 50 to the point M′($i$, 3) of the memory 20. In this manner, the portions 30 are produced where necessary to prevent the line continuity of the character from being broken by the respective thinning unit 24.

Figure 8C:
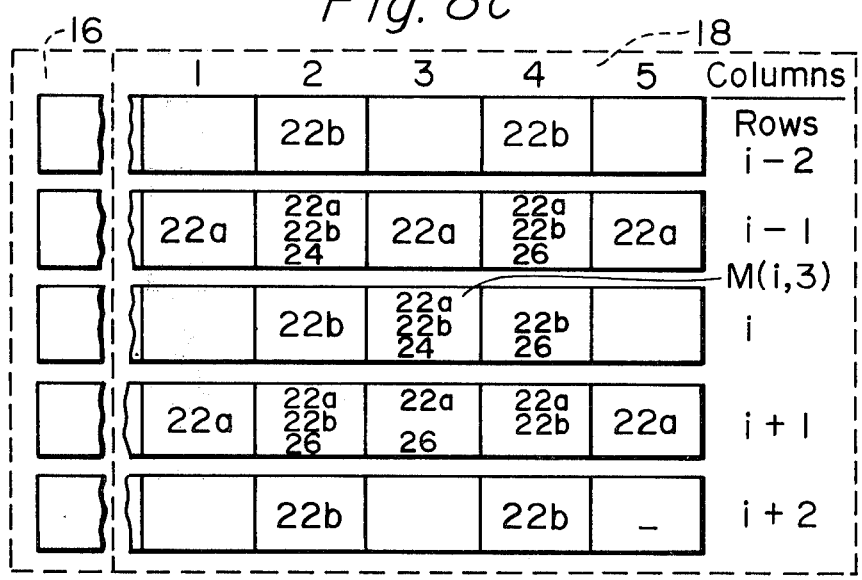

FIG. 8c shows the connections of the inputs of one set of thickening units 22a and 22b, thinning unit 24 and correction unit 26 to one point M($i$, 3) of column 3 of the memory 18. The designations 22a, etc. refer to the units (22a, etc.) whose inputs are connected to the respective point in the memory 18. Since FIG. 8c represents only one set of the m sets of units 22a, 22b, 24 and 26, the inputs of units which are not shown will also be connected to various points in the memory 18 shown in FIG. 8c.

FIG. 8d is similar to FIG. 8c, and shows the connections of the outputs of one set of the units 22a, 22b, 24 and 26 to the memory 20.

Many modifications and alternatives to the embodiment of the present invention herein shown and described are possible to those skilled in the art within the scope of the present invention. For example, the arrangement of the memory or storage means may be such that the shift registers are disposed in series with the output of one connected to the input of the next. The character pattern could then be shifted serially through the memory past one sensing point, and only one set of the units 22a, 22b, 24 and 26 would be required. This arrangement is disadvantageous if m and n are both large, because a large number ($m \times n$) of shifts are required to feed each point of the character pattern past the sensing point during one thickening, etc. step. However, in an application in which m is small compared to n, this option might be desirable.

Another alternative arrangement is to provide a set of units 22a, 22b, 24 and 26 at each point in the memory and sense all the points in the character pattern simultaneously. Although a large number so sets of the units 22a, 22b, 24 and 26 would be required ($m \times n$), this arrangement might be preferred in an application in which operating time is the critical factor, especially if m is small compared to n and more particularly if both m and n are small.

As a further modification, the sense of one or both of the inequalities (1) and (2) may be reversed. Also regarding the thickening units. 22a and 22b, the memories 18 and 20 may have more or less that 5 columns which are sensed by the thickening units 22a and 22b. The thinning unit 24 may be adapted to sense a diagonally adjacent neighbor of the selected point other than the northwest neighbor. The points sensed by the correction unit 26 may also be modified according to the application. It is also obvious that if the scanner 12 scans the document in a vertical raster pattern, the inputs of the units 22a, 22b, 24 and 26 may be connected along a line rather than a column of the memory 18, perpendicular to the direction of main scan, and the shift registers of the memories 16, 18 and 20 be arranged vertically.

It is also possible to arrange the units 22a, 22b, 24 and 26 in a hybrid form. For example, since the thickening units 22a and 22b have a relatively large number of inputs connected to the memory 18, a practical compromise between operating speed and circuit complexity is the preferred embodiment shown and described. However, since the thinning units 24 have only 2 input connections each, it might be desirable to provide a thinning unit 24 for each point of the character pattern to sense and thin all points of the character pattern simultaneously without shifting the memories $n + 5$ times in order to reduce the operating time. This may be done even if the thickening and correction units 22a, 22b and 26 are provided for each line rather than each point, since the thickening, correcting and thinning operations are performed sequentially. This arrangement is desirable in cases where $m$ is much less than $n$, and where $m$ and $n$ are both small.

A more general alternative would be to reverse the order of operations so that the portions of the character having a line thickness greater than a predetermined value would be thinned to the predetermined value, the entire character uniformly thickened, and then the thinning operation repeated.

What is claimed is:

1. In a character recognition system in which a document on which a character is printed is scanned and a character pattern representing the scanned document is obtained in the form of electrical signals arranged in a matrix of rows and columns constituting a quantized representation of the scanned document, the system being operative to compare the character pattern with at least one known character pattern to determine the degree of correspondence therewith, a line thickness regularizing device, comprising:

thickening means operative to sense the electrical signals representing the character pattern and thicken the line thickness of a portion of the character having a line thickness less than a predetermined value to the predetermined value by modifying the electrical signals;

thinning means operative to sense the electrical signals representing the charactter pattern and uniformly thin the line thickness of the character by modifying the electrical signals;

control means operative to control said thickening and thinning means so that the electrical signals are sequentially operated upon by the thickening means, the thinning means and again by the thickening means; and correction means arranged to operate on the electrical signals before operation thereon by said thinning means, said correction means being operative to thicken the line thickness of a portion of the character so that the line continuity of the character will be maintained while the electrical signals are operated upon by the thinning means.

2. A device according to claim 1, further comprising storage means to store the electrical signals representing the character pattern in the form of the matrix, said storage means being operatively connected to said control means and said thickening and thinning means.

3. A device according to claim 2, in which said storage means is controllable by said control means to shift the character pattern therewithin in one direction.

4. A device according to claim 3, in which said thickening means comprises a plurality of thickening units each arranged to sense and thicken the line thickness of said line portion of the character in both the vertical and horizontal dimensions, said thickening units being connected to said storage means on a line perpendicular to the direction of shift of the character pattern.

5. A device according to claim 3, in which said thinning means comprises a plurality of thinning units each arranged to sense and thin the line thickness of the character, said thinning units being connected to said storage means on a line perpendicular to the direction of shift of the character pattern.

6. A device according to claim 2, in which said correction means comprises a plurality of correction units each arranged to sense the character pattern and thicken the line portion of the character so that line continuity of the character will be maintained during operation thereon by said thinning means, said correction units being controlled by said control means to operate on the character pattern after said thickening means and before said thinning means, and said correction units being connected to said storage means on a line perpendicular to the direction of shift of the character pattern.

7. A device according to claim 4, in which at least one of said thickening units comprises a vertical thickening unit and a horizontal thickening unit, said vertical thickening unit being connected to said storage means to sense the contents of said storage means representing a selected point in the matrix and points in the lines above and below the selected point, and being arranged to feed an electrical signal to said storage means to cause the contents of said storage means representing the point in the matrix directly above the selected point to represent a point on the character when the selected point represents a point on the character and a weighted value of the sum of the sensed contents of said storage means representing the points in the line above the selected point is greater than a weighted value of the sum fo the sensed contents of said storage means representing the points in the line below the selected point, and to feed an electrical signal to said storage means to cause the contents of said storage means representing the point in the matrix directly below the sensed point to represent a point on the character when the sensed point represents a point on the character and the weighted value of the sum of the sensed contents of said storage means representing the points in the line above the selected point is one of less than and equal to the weighted value of the sum of the sensed contents of said storage means representing the points in the line below the selected point.

8. A device according to claim 7, in which said horizontal thickening unit is connected to said storage means to sense the contents of said storage means representing the selected point in the matrix and points in the lines to the left and right of the selected point, and is arranged to feed an electrical signal to said storage means to cause the contents of said storage means representing the point in the matrix directly to the left of the selected point to represent a point on the character when the selected point represents a point on the character and a weighted value of the sum of the sensed contents of said storage means representing the points on the line to the left of the selected point is greater than a weighted value of the sum of the sensed contents of said storage means representing the points in the line to the right of the selected point, and to feed an electrical signal to said storage means to cause the contents of said storage means representing the point in the matrix directly to the right of the sensed point to represent a point on the character when the sensed point represents a point on the character and the weighted value of the sum of the sensed contents of said storage means representing the points in the line to the left of the selected point is one of less than and equal to the weighted value of the sum of the sensed contents of said storage means representing the points in the line to the right of the selected point.

9. A device according to claim 5, in which at least one of said thinning units is connected to said storage means to sense the contents of said storage means representing a selected point in the matrix and a point in the matrix diagonally adjacent to the selected point, and is arranged to feed an electrical signal to said storage means to cause the contents of said storage means representing the selected point to represent a point on the background of the character pattern when both of the sensed contents of said storage means represent points on the character.

10. A device according to claim 9, in which the point diagonally adjacent to the selected point is above and to the left of the selected point.

11. A device according to claim 6, in which at least one of said correction units is connected to said storage means to sense the contents of said storage means representing the points directly to the right of, below to the upper right and to the lower left of the selected point in the matrix, and is arranged to feed an electrical signal to said storage means to cause the contents of said storage means representing the selected point to represent a point on the character when all of the sensed contents represent points on the character.

12. A device according to claim 7, in which said vertical thickening unit comprises:
- a comparator having one input connected to the points in said storage means representing the points in the line above the selected point in the matrix, said comparator having another input connected to the points in said storage means representing the points in the line below the selected point, each of said points in said storage means being connected to the respective input of said comparator through a respective resistor;
- a first AND gate having one input connected to the output of said comparator and another input connected to the point in said storage means representing the selected point, the output of said first AND gate being connected to the point in said storage means representing the point in the matrix directly above the selected point; and
- a second AND gate having one input connected through an inverter to the output of said comparator and a second input connected to the point in said storage means representing the selected point, the output os said second AND gate being connected to the point in said storage means representing the point in the matrix directly below the selected point.

13. A device according to claim 8, in which said horizontal thickening unit comprises:
- a comparator having one input connected to the points in said storage means representing the points in the line to the left of the selected point in the matrix, said comparator having another input connected to the points in said storage means representing the points in the line to the right of the selected point, each of said points in said storage means being connected to the respective input of said comparator through a respective resistor;
- a first AND gate having one input connected to the output of said comparator and another input connected to the point in said storage means representing the selected point, the output of said first AND gate being connected to the point in said storage means representing the point in the matrix directly to the left of the selected point; and
- a second AND gate having one input connected through an inverter to the output of said comparator and a second input connected to the point in said storage means representing the selected point, the output of said second AND gate being connected to the point in said storage means representing the point in the matrix directly to the right of the selected point.

14. A device according to claim 9, in which said thinning unit comprises an AND gate having one input connected to the point in said storage means representing the selected point and another input connected to the point in said storage means representing the point diagonally adjacent to the selected point, the output of said AND gate being connected to the point in said storage means constituting a reset input for the contents of said storage means representing the selected point.

15. A device according to claim 11, in which said correction unit comprises an AND gate having inputs connected respectively to points in said storage means representing the points in the matrix to the right, below, to the upper right and to the lower left of the selected point, the output of said AND gate being connected to a point in said storage means representing the selected point.

16. A device according to claim 3, in which said storage means comprises:
- a main memory in the form of a plurality of shift registers, each shift register storing a line of the matrix and being shiftable in the horizontal direction;
- a first auxiliary memory in the form of a plurality of shift registers, the number of said shift registers in said first auxiliary memory being equal to the number of said shift registers in said main memory, and the inputs of said shift registers of said first auxiliary memory being connected respectively to the outputs of said shift registers of said main memory;
- a second auxiliary memory in the form of a plurality of shift registers, the number of said shift registers of said second auxiliary memory being equal to the number of said shift registers of said main memory, the inputs of said shift registers of said second auxiliary memory being connected respectively to the outputs of said shift registers of said main memory and the outputs of said shift register of said second auxiliary memory being connected respectively to the inputs of said shift registers of said main memory;
- said thickening means being in the form of a plurality of thickening units, the number of said thickening units being equal to the number of said shift registers of said main memory, the inputs of said thickening units being connected respectively to points in said shift registers of said first auxiliary memory in a vertical arrangement and the outputs of said thickening units being connected respectively to points in said shift registers of said second auxiliary memory in a vertical arrangement representing the same points in the matrix as the points in said first auxiliary memory; and said thinning means being in the form of a plurality of thinning units having inputs and outputs connected respectively to the same points in said storage means as said thickening units;

said control means being operative to sequentially activate said thickening means, said thinning means, and again said thickening means while shifting the character pattern through said storage means.

* * * * *